(12) United States Patent
Espejo (10) Patent No.: US 9,902,353 B1
(45) Date of Patent: Feb. 27, 2018

(54) DEVICE FOR PROTECTING THE BUMPER OF A VEHICLE AND METHOD OF USE

(71) Applicant: Enercio Antonio Espejo, Bronx, NY (US)

(72) Inventor: Enercio Antonio Espejo, Bronx, NY (US)

( * ) Notice: Subject to any disclaimer, the term of this patent is extended or adjusted under 35 U.S.C. 154(b) by 0 days.

(21) Appl. No.: 15/082,033

(22) Filed: Mar. 28, 2016

Related U.S. Application Data (60) Provisional application No. 62/178,461, filed on Apr. 11, 2015.

(51) Int. Cl.
*B60R 19/46* (2006.01)
*B60R 19/14* (2006.01)
*B60R 19/02* (2006.01)
*B60R 19/38* (2006.01)
*B60R 19/40* (2006.01)

(52) U.S. Cl.
CPC ............ *B60R 19/46* (2013.01); *B60R 19/023* (2013.01); *B60R 19/14* (2013.01); *B60R 19/38* (2013.01); *B60R 19/40* (2013.01)

(58) Field of Classification Search
CPC ....... B60R 19/38; B60R 19/023; B60R 19/14; B60R 19/40; B60R 19/46
USPC ........................................... 296/145; 293/142
See application file for complete search history.

(56) References Cited

U.S. PATENT DOCUMENTS

| | | | | |
|---|---|---|---|---|
| 3,718,357 A * | 2/1973 | Hertzell | ................... | B60R 13/04 293/128 |
| 7,338,100 B2 * | 3/2008 | Meyer | ..................... | B60R 19/44 150/166 |
| 8,047,601 B2 * | 11/2011 | Malina | ..................... | B60R 19/44 293/142 |

* cited by examiner

*Primary Examiner* — Joseph D. Pape
*Assistant Examiner* — Dana D Ivey
(74) *Attorney, Agent, or Firm* — Ted Masters

(57) ABSTRACT

A device for protecting the bumper of a vehicle having an undercarriage includes a bumper protector which is connectable to the undercarriage of the vehicle. The bumper protector includes a cushion which is positionable to (1) a retracted position beneath the undercarriage of the vehicle, and (2) an extended position outwardly projecting from the vehicle. In the extended position the cushion is rotatable to an upright position outside the bumper of the vehicle. The cushion protects the bumper during a collision with another vehicle or object.

5 Claims, 11 Drawing Sheets

DEVICE FOR PROTECTING THE BUMPER OF A VEHICLE AND METHOD OF USE

CROSS REFERENCE TO RELATED APPLICATION

This application claims the filing benefit under 35 U.S.C. § 119(e) of U.S. Provisional Application No. 62/178,461, filed Apr. 11, 2015, which is hereby incorporated by reference.

TECHNICAL FIELD

The invention generally pertains to motor vehicles, and more particularly to a bumper protector which protects the bumper of the vehicle.

BACKGROUND OF THE INVENTION

The bumpers of vehicle can be damaged by minor collisions with other vehicles. Such collisions typically occur during the parallel parking of vehicles on streets where parking space is limited. In order to park a vehicle in a tight space, it is often difficult or even impossible not to bump the vehicle which is in front of or behind the parking space. These bumps can leave dents, scratches, and mares on the bumpers of both involved vehicles.

BRIEF SUMMARY OF THE INVENTION

The present invention is directed to a device for protecting the bumper of a vehicle. The device has a cushion (pad) which is positionable adjacent to the bumper. The cushion absorbs and distributes impact and prevents the bumper from being dented, scratched, or marred. The device is typically placed in an in-use position after a vehicle is parked to protect its bumper from a bump from another vehicle. It is placed in a stored position underneath the vehicle during driving and when bumper damage is not an issue. The device can also be placed in the in-use position before the user parks his or her vehicle, thereby preventing damage to the bumper during the parking process.

In accordance with an embodiment, a device for protecting the bumper of a vehicle having an undercarriage includes a bumper protector which is connectable to the undercarriage of the vehicle. The bumper protector includes a cushion. When the bumper protector is connected to the undercarriage of the vehicle, the cushion is positionable to (1) a retracted position beneath the undercarriage of the vehicle, and (2) an extended position outwardly projecting from the vehicle. When in the extended position the cushion is rotatable to an upright position outside the bumper of the vehicle.

In accordance with another embodiment, the cushion is substantially planar.

In accordance with another embodiment, the vehicle is disposed upon a support surface. In the retracted position the cushion is disposed parallel to the support surface.

In accordance with another embodiment, the bumper protector includes a slide mechanism which carries the cushion such that in the retracted position the cushion slides beneath the undercarriage of the vehicle, and in the extended position the cushion slides out from beneath the undercarriage of the vehicle.

In accordance with another embodiment, the slide mechanism includes a pair of rails and a sliding member which slides along the rails. The cushion is rotatably connected to the sliding member by a hinge.

In accordance with another embodiment, a retainer holds the cushion in the upright position.

In accordance with another embodiment, the retainer is a strap.

In accordance with another embodiment, the vehicle has a license plate. The cushion has a license plate aperture which permits the license plate to be viewed from behind the vehicle.

In accordance with another embodiment, the cushion has a handle for placing the cushion in the retracted position, for placing the cushion in the extended position, and for rotating the cushion to the upright position. A mud flap removable covers the handle.

In accordance with another embodiment, the handle includes an aperture in the cushion. The mud flap has a plug which is snuggly removably received by the aperture.

In accordance with another embodiment, a connector connects the bumper protector to the undercarriage of the vehicle.

Other embodiments, in addition to the embodiments enumerated above, will become apparent from the following detailed description, taken in conjunction with the accompanying drawings, which illustrate, by way of example, the principles of the device and method of use.

DETAILED DESCRIPTION OF THE INVENTION

Figure 1:
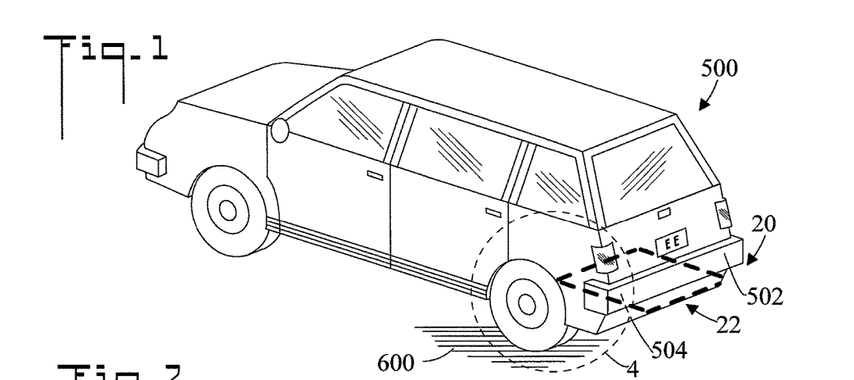
FIG. 1 is a rear perspective view of a prior art vehicle with a device for protecting the bumper of the vehicle connected to the undercarriage of the vehicle, the device in a stored position.
Figure 2:
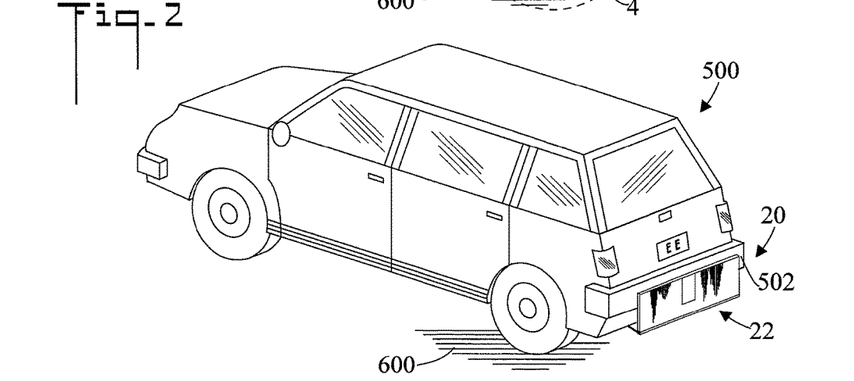
FIG. 2 is a rear perspective view with the device in an in-use position.
Figure 3:
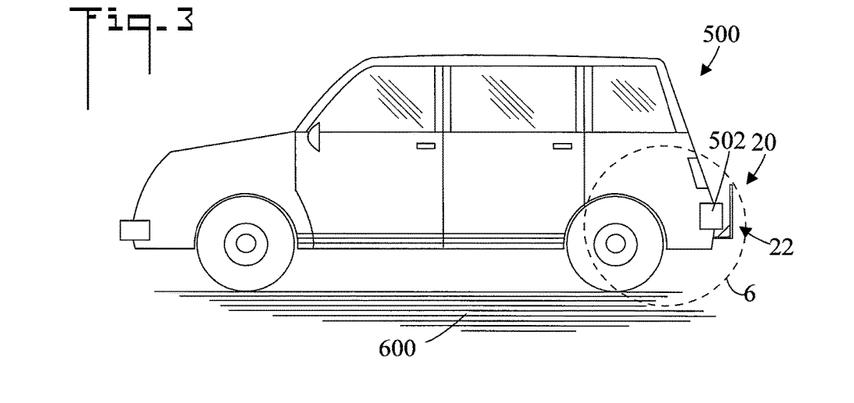
FIG. 3 is a side elevation view as in FIG. 2.
Figures 4, 5, 7:
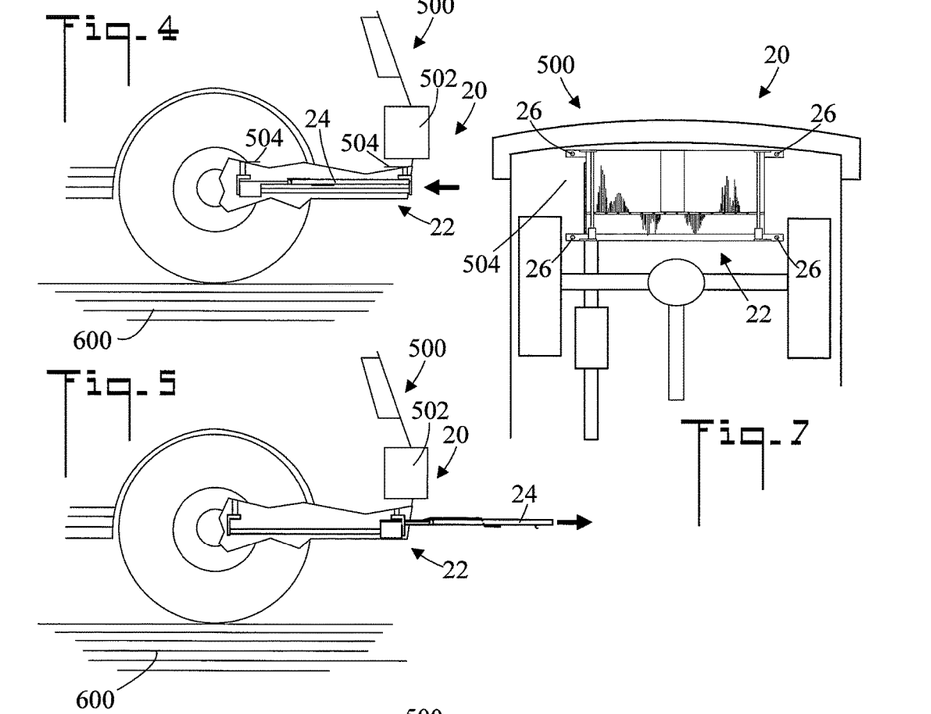
FIG. 4 is an enlarged breakaway side elevation view of area 4 of FIG. 1.
FIG. 5 is an enlarged breakaway side elevation view of the device in an intermediate pulled out position.
FIG. 7 is a fragmented bottom plan view of the undercarriage of the vehicle with the device installed and in the stored position.
Figure 6:
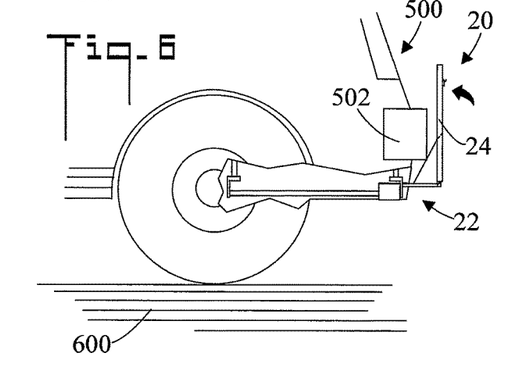
FIG. 6 is an enlarged breakaway view of area 6 of FIG. 3.

Referring initially to FIG. 1, there is illustrated a rear perspective view of a prior art vehicle 500 having a bumper 502 and an undercarriage 504 (the supporting frame under the main body of vehicle 500), with a device 20 for protecting the bumper 502 installed. Device 20 includes a bumper protector 22 which is connectable to undercarriage 504 of the vehicle 500. In FIG. 1, device 20 is in a stored position. FIG. 2 is a rear perspective view of the vehicle 500 with device 20 in an in-use position, and FIG. 3 is a side elevation view as in FIG. 2. FIG. 4 is an enlarged breakaway side elevation view of area 4 of FIG. 1, FIG. 5 is an enlarged breakaway side elevation view of device 20 in an intermediate pulled out position, and FIG. 6 is an enlarged breakaway view of area 6 of FIG. 3. Vehicle 500 can be any motor vehicle such as an automobile, truck, van, SUV, or the like. Vehicle 500 is disposed upon a support surface 600 such as a street, parking lot, driveway, etc. Bumper protector 22 includes a cushion 24. In the stored position of FIG. 1, cushion 24 is disposed out of the way beneath the undercarriage 504 of vehicle 500. In the in-use position of FIG. 2, cushion 24 is pulled out from beneath undercarriage 504, and cushion 24 is rotated to an upright position to protect bumper 502 from a collision. Cushion 24 serves to protect bumper 502 by absorbing and distributing the impact of another object, and particularly the impact caused by the bumper of another vehicle (also refer to FIG. 27).

Cushion 24 is positionable to (1) a retracted position where it resides beneath the undercarriage 504 of the vehicle (refer to FIG. 4), and (2) an extended position outwardly projecting from the vehicle 500 (refer to FIG. 5). That is, cushion 24 is pulled straight out from beneath undercarriage 504 (refer to FIG. 5). In the extended position cushion 24 is then rotatable to an upright position outside the bumper 502 of the vehicle 500 (refer to FIG. 6). In other words when cushion 24 is in the upright position bumper 502 is disposed between cushion 24 and the main body of vehicle 500. In this position, cushion 24 protects bumper 502 from collisions with external objects. It is noted in FIGS. 2-6 that cushion 24 is substantially planar, and that in the retracted position of FIG. 4 cushion 24 is disposed parallel to support surface 600. That is, in the retracted position on a level support surface 600 cushion 24 is substantially horizontal. In the upright position cushion 24 will be substantially vertical if vehicle 500 is disposed upon a level (not angled) support surface 600.

FIG. 7 is a fragmented bottom plan view of the undercarriage 504 of the vehicle 500 with the device 20 installed and cushion 24 in the retracted position. Device 20 further includes a connector 26 for connecting bumper protector 22 to the undercarriage 504 of vehicle 500. In the shown embodiment connector 26 includes a plurality of bolts which connect bumper protector 22 to undercarriage 504. However it may be appreciated that bumper protector 22 could be connected in any convenient mechanical manner such as with bolts, screws, brackets, flanges, clamps, wires, metal tapes, or the like, or a combination of these. The specific manner of connection will depend upon the particular configuration of undercarriage 504. Generally speaking, bumper protector 24 will be connected under the cargo area of vehicle 500, however it can also be connected under the front of vehicle 500 to protect the front bumper (refer to FIG. 27).

Figure 8:
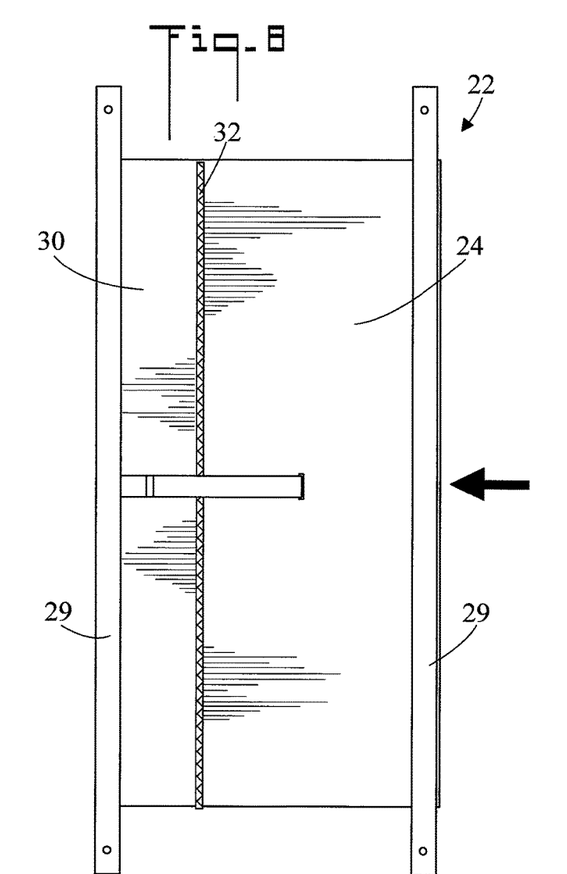
FIG. 8 is a top plan view of the bumper protector with a cushion in the retracted position.
Figure 9:
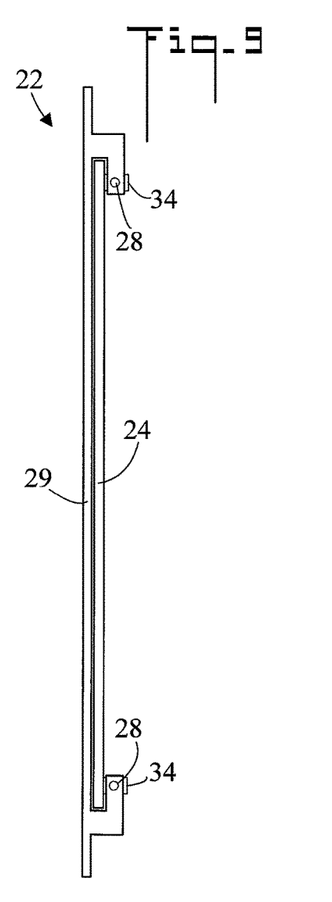
FIG. 9 is a front elevation view as in FIG. 8.
Figure 10:
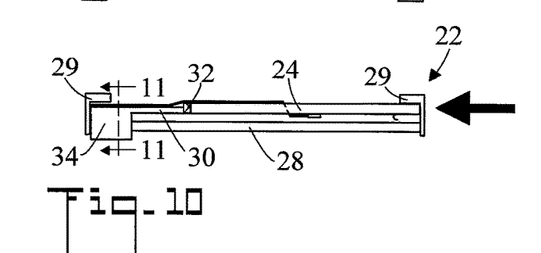
FIG. 10 is a side elevation view as in FIG. 8.
Figure 11:
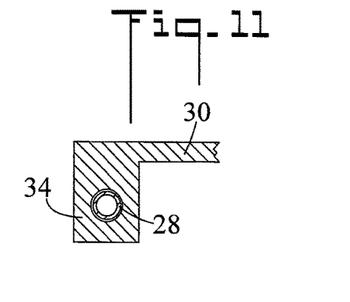
FIG. 11 is an enlarged cross sectional view along the line 11-11 of FIG. 10.

FIGS. 8-10 are top plan, front elevation, and side elevation views respectively of bumper protector 22 with cushion 24 in the retracted position. FIG. 11 is an enlarged cross sectional view along the line 11-11 of FIG. 10. Cushion 24 can be fabricated from rubber, a polymer, or other shock absorbing material which has a soft surface so that it will not scratch or mare bumper 502. In an embodiment, cushion 24 is made from rubber with embedded reinforcing members (such as metal rods or a metal mesh) so that it keeps its shape. Cushion 24 is designed such that it will remain in the retracted position until it is pulled out to the extended position by the user.

Figure 12:
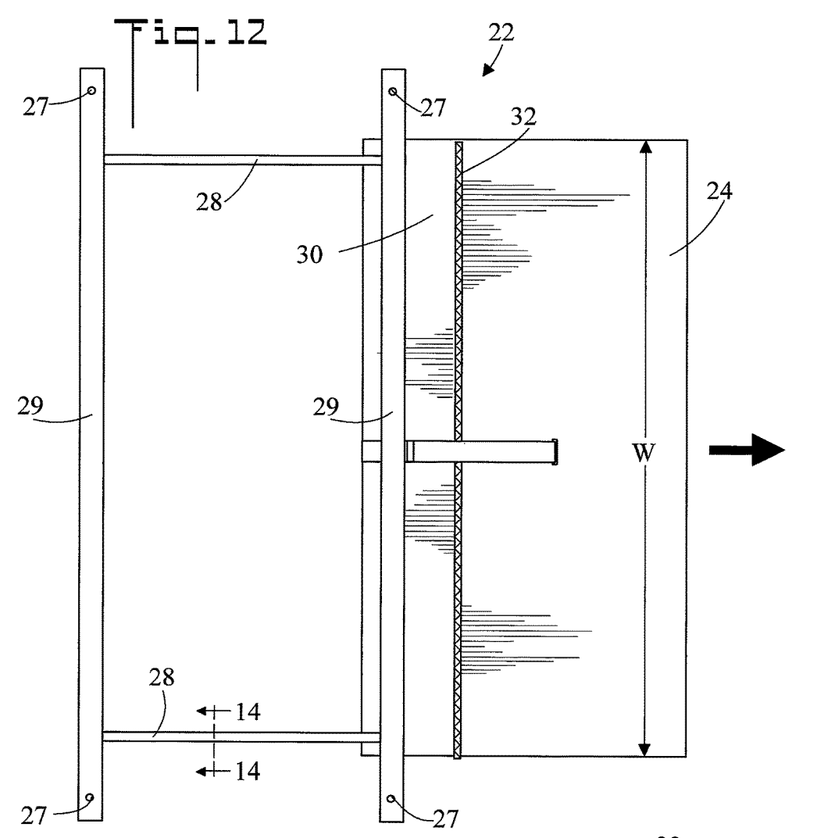
FIG. 12 is a top plan view of the bumper protector with the cushion in an extended position.
Figure 13:
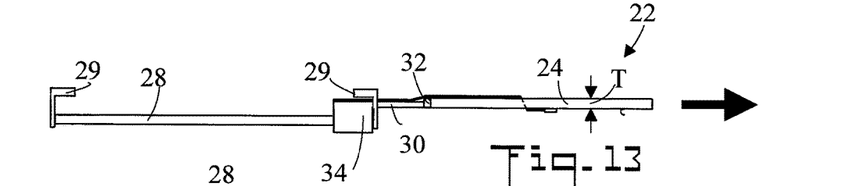
FIG. 13 is a side elevation view as in FIG. 12.
Figure 14:
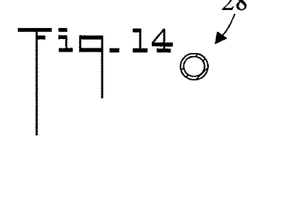
FIG. 14 is an enlarged cross sectional view along the line 14-14 of FIG. 12.

FIGS. 12-13 are top plan, and side elevation views respectively of the bumper protector 22 with cushion 24 in the extended position, and FIG. 14 is an enlarged cross sectional view along the line 14-14 of FIG. 12. Also referring to FIGS. 10 and 11, bumper protector 22 includes a slide mechanism which carries cushion 24 such that in the retracted position cushion 24 slides beneath the undercarriage 504 of the vehicle 500 (refer to FIG. 4), and in the extended position cushion 24 slides out from beneath the undercarriage 504 of vehicle 500 (refer to FIG. 5). In the shown embodiment, the slide mechanism includes a pair of rails 28 and a sliding member 30 which slides along rails 28. In the shown embodiment rails 28 are tubes as is shown in FIG. 14, however rods or other forms of rails could also be utilized. Rails 28 are connected together by a pair of cross members 29, which in the shown embodiment include mounting holes 27 to effect the connection of bumper protector 22 to undercarriage 504 (refer to FIG. 7). In an embodiment cushion 24 has a width W of between about 24 and 48 inches depending upon the vehicle bumper 502 being protected, and a thickness T of between about 0.5 and 1.0 inches.

Cushion 24 is rotatably connected to sliding member 30 by a hinge 32 which allows cushion 24 to be rotated (pivoted with respect to sliding member 30) to the upright position of FIGS. 2, 3, and 6. In the shown embodiment hinge 32 is a flexible seam such as made from heavy-duty fabric or other resiliently bendable material. However it may be appreciated that hinge 32 could take other forms such as a barrel hinge, continuous hinge, and the like (refer also to FIG. 28 and the associated discussion). Sliding member 30 includes two sliders 34. Sliders 34 each slidably receive one rail 28 which allows sliding member 30 to slide along rails 28. As shown, in the retracted position of FIG. 10 slider 34 has moved all the way to left along rails 28 (retracted position of cushion 24), and in FIG. 13 slider 34 has moved all the way to the right along rails 28 (extended position of cushion 24). Cross members 29 prevent slider 34 from coming off of rail 28. FIG. 11 shows the relationship of sliding member 30, slider 34, and rail 28.

Figure 15:
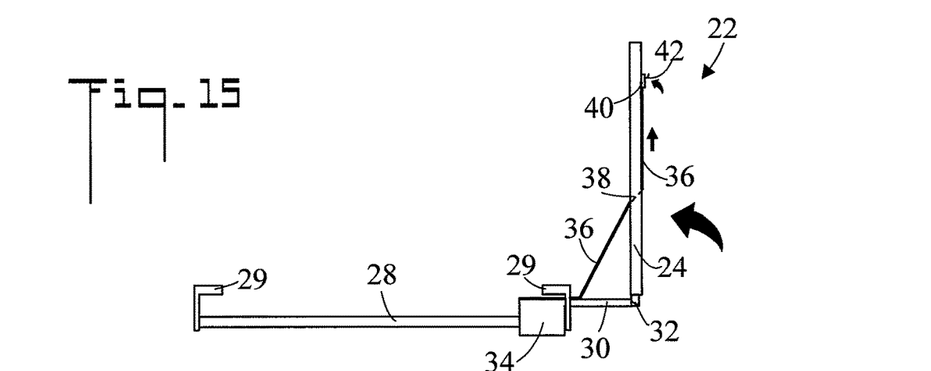
FIG. 15 is a side elevation view of the cushion rotated to an upright position.

FIG. 15 is a side elevation view of cushion 24 rotated to the upright position (refer also to FIGS. 2, 3, and 6). Shown are cushion 24, rail 28, cross members 29, sliding member 30, hinge 32, and slider 34.

Figure 16:
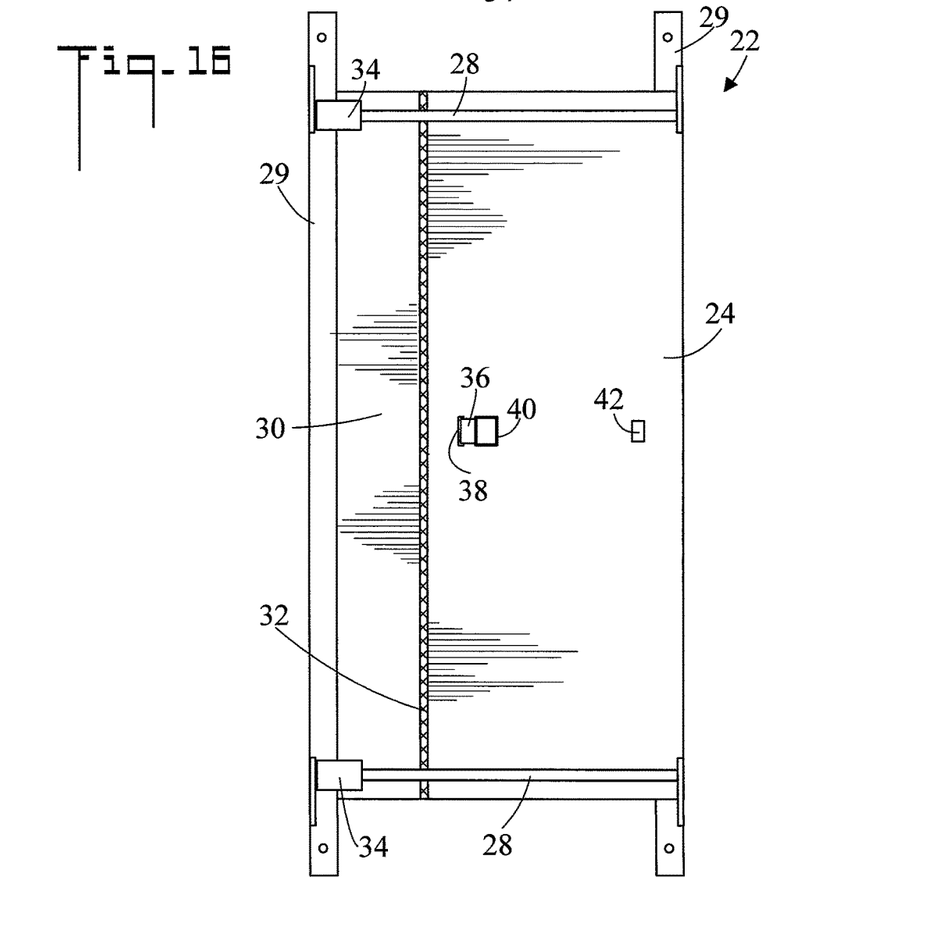
FIG. 16 is a bottom plan view of the bumper protector with the cushion in the retracted position.

FIG. 16 is a bottom plan view of bumper protector 22 with cushion 24 in the retracted position. Also shown are rails 28, cross members 29, sliding member 30, hinge 32, and slider 34.

Figure 17:
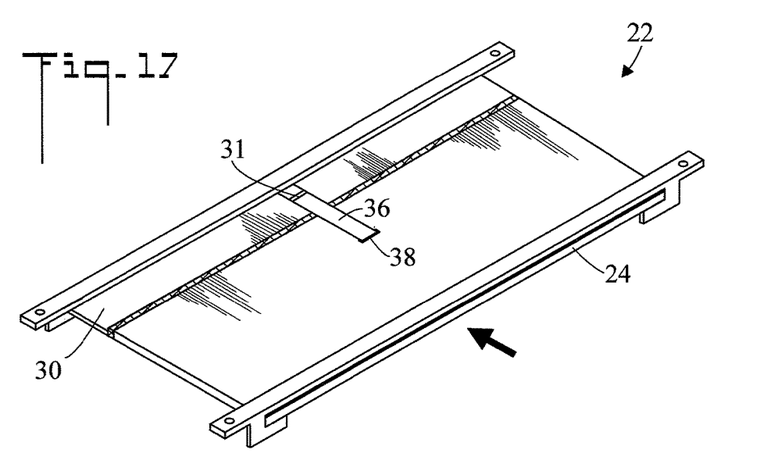
FIG. 17 is a perspective view of the bumper protector with the cushion in the retracted position.
Figure 18:
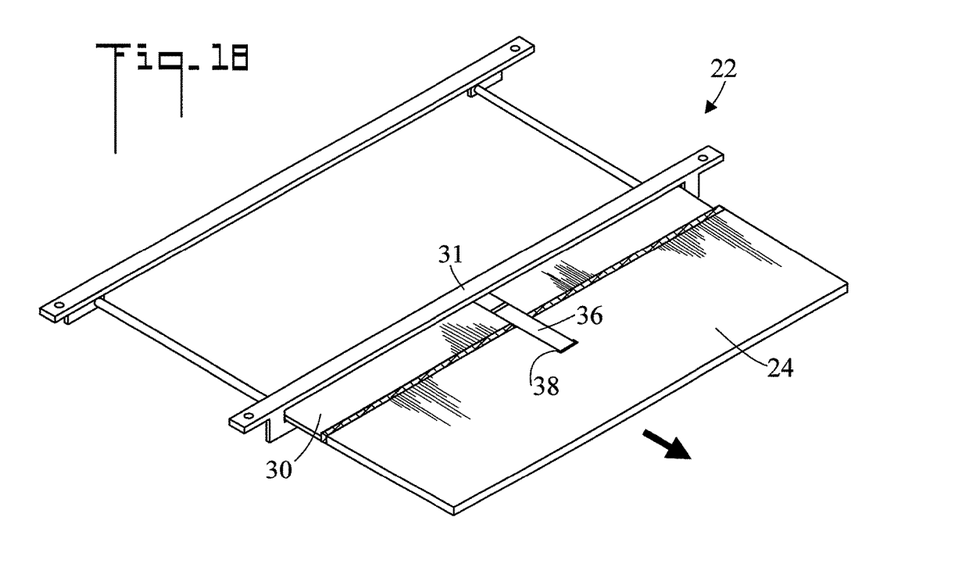
FIG. 18 is a perspective view of the bumper protector with the cushion in the extended position.
Figure 19:
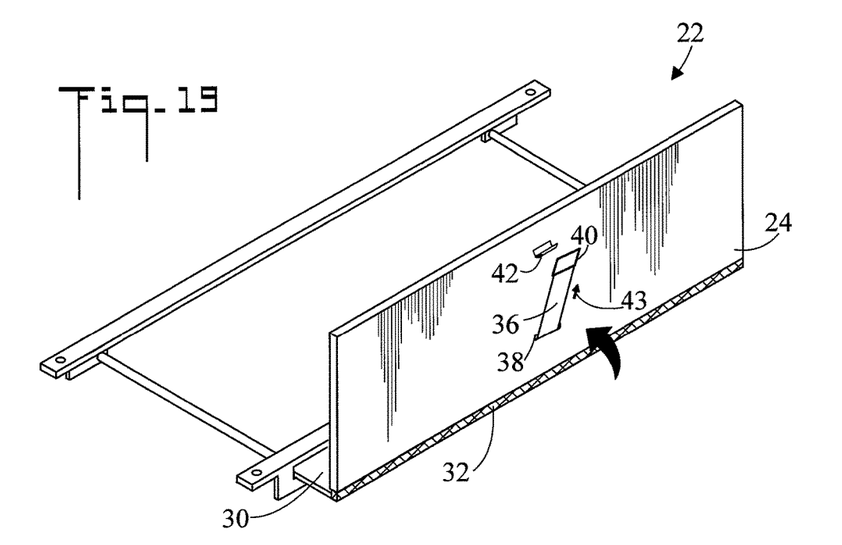
FIG. 19 is a perspective view of the cushion rotated to the upright position with an unconnected retainer.
Figure 20:
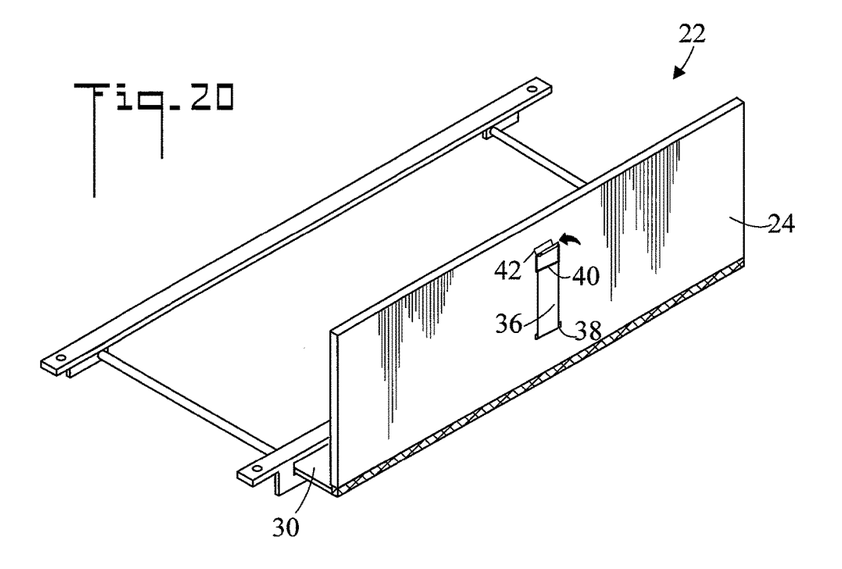
FIG. 20 is a perspective view as in FIG. 19 with the retainer connected.

FIG. 17 is a perspective view of bumper protector 22 with cushion 24 in the retracted position, FIG. 18 is a perspective view of bumper protector 22 with cushion 24 in the extended position, FIG. 19 is a perspective view of cushion 24 rotated to the upright position with an unconnected retainer for holding cushion 24 in the upright position, and FIG. 20 is a perspective view as in FIG. 19 with the retainer connected. In the shown embodiment the retainer is a strap 36. One end of strap 36 is fixedly connected to sliding member 30 at 31. Strap 36 then passes thorough an aperture 38 in cushion 24. A loop 40 (rectangular as shown) is connected to the opposite end of strap 36. A hook 42 is connected to cushion 24. In FIG. 18 as cushion 24 is rotated to upright position, strap 36 is pulled up through aperture 38 in direction 43. Then in FIG. 20, loop 40 is pulled over hook 42 to hold cushion 24 in the upright position (also refer to FIG. 15). In may be appreciated that other types of retainers could be utilized to hold cushion 24 in the upright position, such as cables, wires, clips, chains, pins, ratchets, or the like (also refer to FIG. 25). It may be appreciated that a view from the opposite side will be the mirror image of that shown in FIGS. 17-20.

Figure 21:
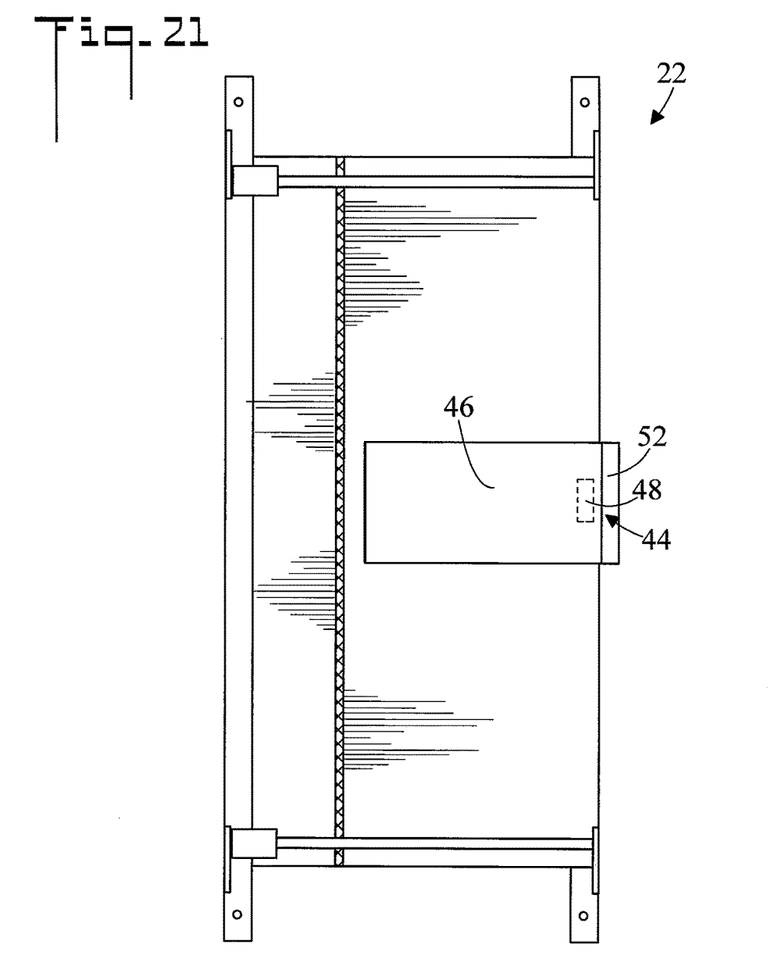
FIG. 21 is a bottom plan view of the bumper protector having a mud flap.
Figure 22:
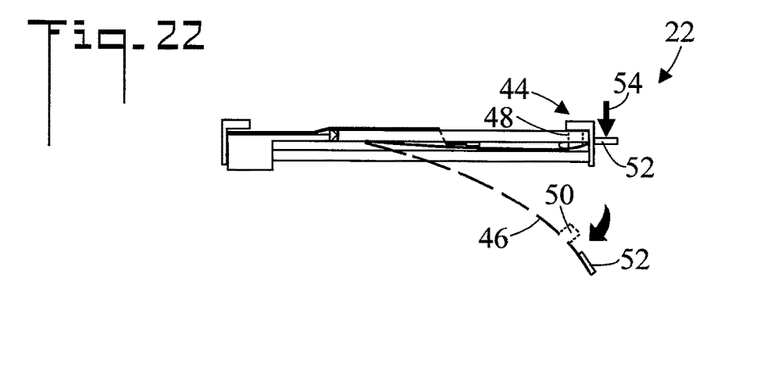
FIG. 22 is a side elevation view of FIG. 21.
Figure 23:
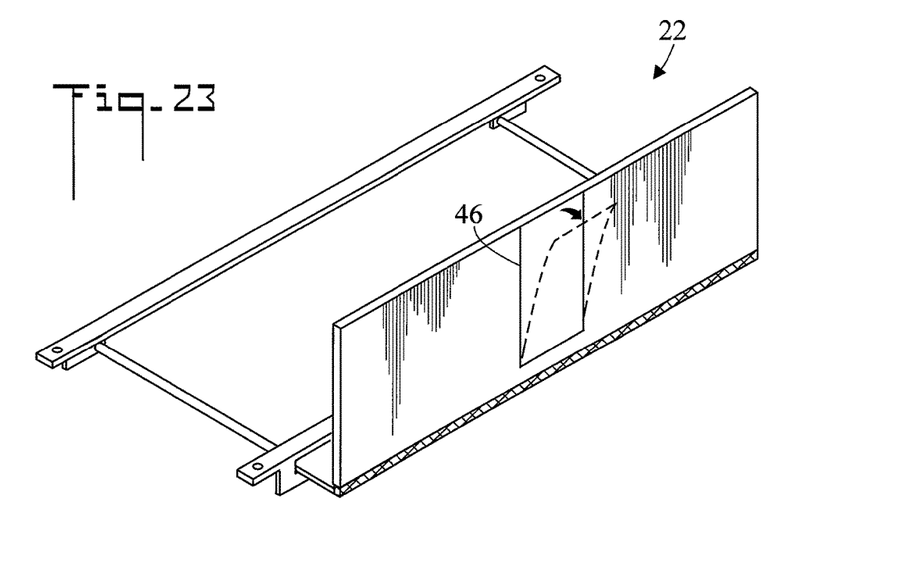
FIG. 23 is a perspective view of the bumper protector with the mud flap.

FIGS. 21-23 are bottom plan, side elevation, and perspective views respectively of bumper protector 22 having a handle 44 and a mud flap 46 which removably covers handle 44. In the shown embodiment handle 44 includes an aperture 48 which can receive the fingers of a user. Handle 44 is used for placing cushion 24 in the retracted position, for placing cushion 24 in the extended position, and for rotating cushion 24 to the upright position. To hold mud flap 46 in place over handle 44, mud flap 46 has a plug 50 which is snuggly removably received by aperture 48 in cushion 24. In order to release mud flap 46 when cushion 24 is in the retracted position (FIG. 22), mud flap 46 includes a release 52 which extends past the edge of cushion 24. Release 52 can be activated by the foot of the user in downward direction 54 as is shown in FIG. 22, wherein plug 50 is forced out of aperture 48 and mud flat 46 falls down due to gravity. Mud flap 46 is useful in covering handle 44 so that handle 46 will remain clean and not become covered with road dirt, oil, and grime. As such, the user's hand will not become soiled when positioning cushion 24.

Figure 24:
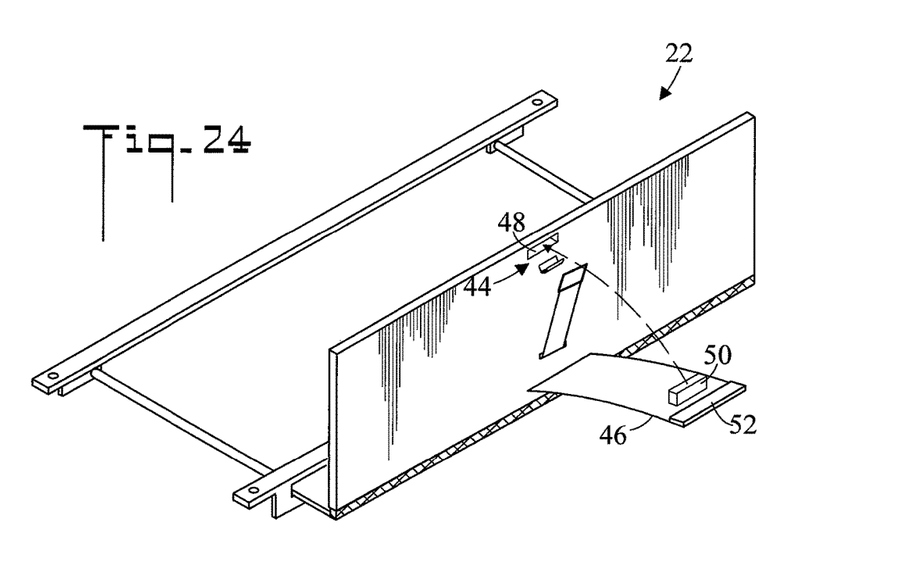
FIG. 24 is another perspective view of the bumper protector and the mud flap.

FIG. 24 is another perspective view of bumper protector 22, handle 44, and mud flap 46. Also shown are aperture 48, plug 50, and release 52.

Figure 25:
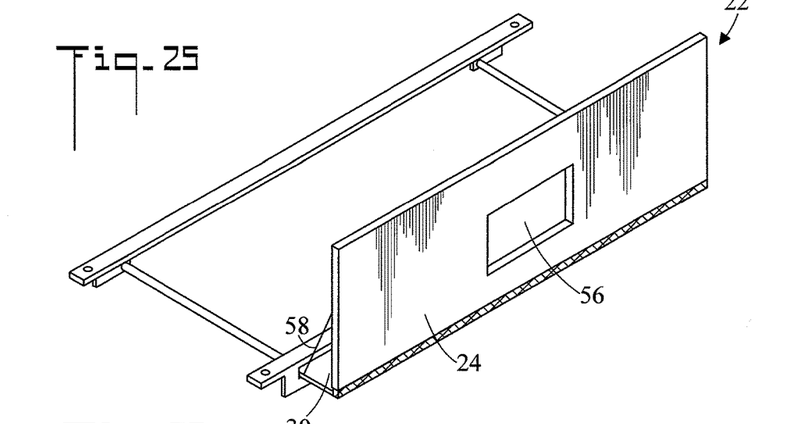
FIG. 25 is a perspective view of the cushion with a license plate aperture; and, FIG. 26 is a perspective view of a vehicle having a license plate.
Figure 26:
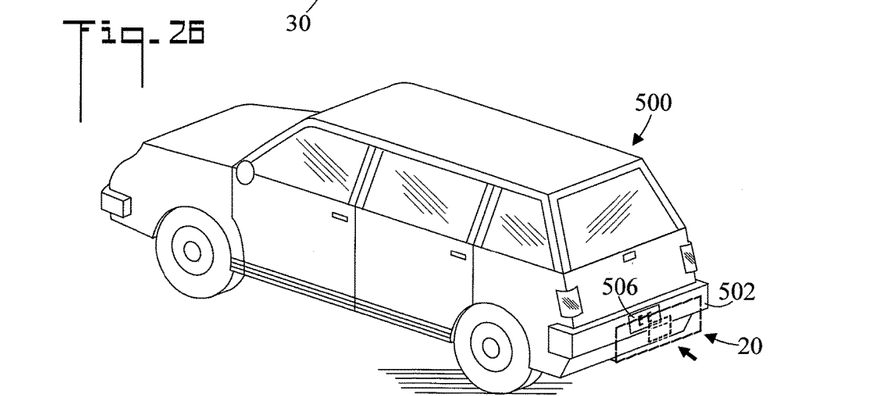

FIG. 25 is a perspective view of cushion 24 with a license plate aperture 56, and FIG. 26 is a perspective view of a vehicle 500 having a license plate 506. In the shown embodiment, license plate 506 is disposed on the bumper 502 of vehicle 500. License plate aperture 56 permits the license plate 506 to be viewed from behind the vehicle 500. It is noted that in this embodiment cushion 24 is held in the upright position by a cable 58 which is connected between sliding member 30 and cushion 24. This is because the strap 36 of FIG. 20 would interfere with the view of license plate 506. In another embodiment, the cable 58 could connect cushion 24 to vehicle 500 such as to a license plate holder.

Figure 27:
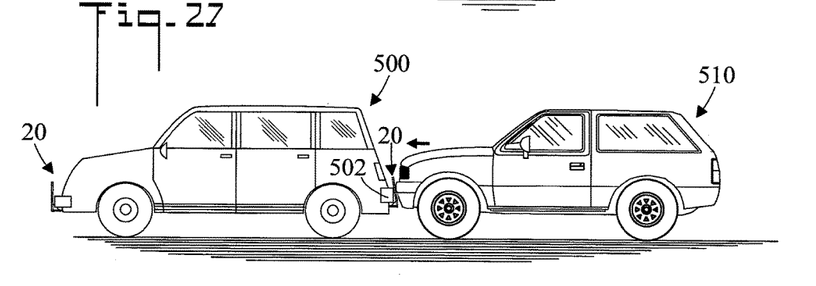
FIG. 27 is a reduced side elevation view of the bumper protector protecting the bumper from a collision with another vehicle; and, FIG. 28 is an enlarged fragmented side elevation view of an embodiment of a hinge.

FIG. 27 is a reduced side elevation view of device 20 protecting the bumper 502 of vehicle 500 from a collision with another vehicle 510. It is noted that device 20 protector 22 can also be installed on the front of vehicle 500 to protect the front bumper.

Figure 28:
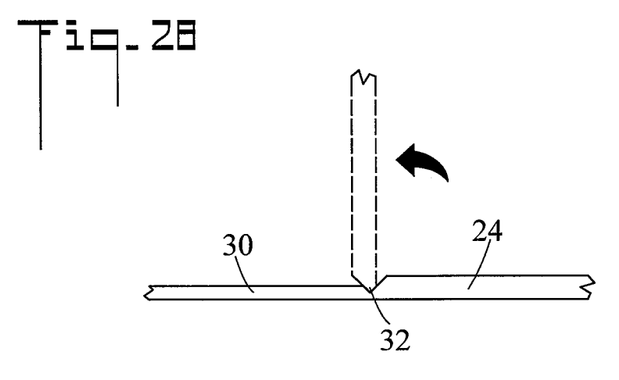

FIG. 28 is an enlarged fragmented side elevation view of an embodiment of hinge 32. In this embodiment cushion 24 and sliding member 30 are fabricated from a continuous piece of material (such as rubber). Hinge 32 includes a groove between cushion 24 and sliding member 30. The groove allows cushion 24 to be rotated (folder) with respect to sliding member 30 to the upright position shown in broken lines.

In another embodiment device 20 is combined with vehicle 500 to form a system for protecting the bumper 502 of the vehicle 500.

In terms of use, a method for protecting the bumper 502 of a vehicle 500 includes:

(a) providing a vehicle 500 having a bumper 502 and an undercarriage 504;

(b) providing a device 20 for protecting the bumper 502 of the vehicle 500 including;
   a bumper protector 22 which is connectable to the undercarriage 504 of
   the vehicle 500, the bumper protector 22 including:
     a cushion 24;
     when the bumper protector 22 is connected to the undercarriage 504 of the vehicle 500, the cushion 24 is positionable to (1) a retracted position beneath the undercarriage 504 of the vehicle 500, and (2) an extended position outwardly projecting from the vehicle 500; and,
     when in the extended position the cushion 24 is rotatable to an upright position outside the bumper 502 of the vehicle 500;
     a slide mechanism which carries the cushion 24 such that in the retracted position the cushion 24 slides beneath the undercarriage 504 of the vehicle 500, and in the extended position the cushion 24 slides out from beneath the undercarriage 504 of the vehicle 500;
   a connector 26 for connecting the bumper protector 22 to the undercarriage 504 of the vehicle 500;

(c) using the connector 26 to connect the bumper protector 22 to the undercarriage 504 of the vehicle 500;

(d) placing the cushion 24 in the retracted position;

(e) placing the cushion 24 in the extended position; and, (f) when in the extended position, rotating the cushion 24 to the upright position.

The method further including;
in (a), the vehicle 500 disposed upon a support surface 600;
in (b), the cushion 24 being substantially planar; and,
in (d), the cushion 24 disposed parallel to the support surface 600.

The method further including:
in (b), the slide mechanism including a pair of rails 28 and a sliding member 30 which slides along rails 28, the cushion 24 rotatably connected to the sliding member 30 by a hinge 32; and,
in (f), the cushion 24 rotating about the hinge 32.

The method further including:
in (b), a retainer for holding the cushion 24 in the upright position; and, in (f), using the retainer to hold the cushion 24 in the upright position.

The method further including:

the retainer being a strap 36.

The method further including:

in (b), the cushion 24 having a handle 44 for placing the cushion 24 in the retracted position, for placing the cushion 24 in the extended position, and for rotating the cushion 24 to the upright position, and a mud flap 46 which removably covers the handle 44;

positioning the mud flap 46 so that the handle 44 is uncovered;

in (d), using the handle 44 to place the cushion 24 in the retracted position;

in (e), using the handle 44 to place the cushion 24 in the extended position; and, in (f), using the handle 44 to rotate the cushion 24 to the upright position.

The method further including:

the handle 44 including an aperture 48 in the cushion 24;

the mud flap 46 having a plug 50 which is snuggly removably received by the aperture 48; and, before (d), (e), and (f), ensuring that the mud flap 46 does not cover the handle 44.

The embodiments of the device and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the device and method should be construed as limiting the invention to a particular embodiment or combination of embodiments. The scope of the invention is defined by the appended claims.

I claim:

1. A device for protecting the bumper of a vehicle having an undercarriage, the device comprising:

a bumper protector which is connectable to the undercarriage of the vehicle, said bumper protector including:

a cushion;

said bumper protector is connectable to the undercarriage of the vehicle so that said cushion is positionable to (1) a retracted position beneath the undercarriage of the vehicle, and (2) an extended position outwardly projecting from the vehicle;

in said extended position said cushion is rotatable to an upright position outside the bumper of the vehicle;

said cushion having a handle for placing said cushion in said retracted position, for placing said cushion in said extended position, and for rotating said cushion to said upright position; and, a mud flap which removably covers said handle.

2. The device according to claim 1, further including:

said handle including an aperture in said cushion; and, said mud flap having a plug which is snuggly removably received by said aperture.

3. A device for protecting the bumper of a vehicle having an undercarriage, the vehicle disposed upon a support surface, the device comprising:

a bumper protector which is connectable to the undercarriage of the vehicle, said bumper protector including:

a cushion;

said bumper protector is connectable to the undercarriage of the vehicle so that said cushion is positionable to (1) a retracted position beneath the undercarriage of the vehicle, and (2) an extended position outwardly projecting from the vehicle;

in said extended position said cushion is rotatable to an upright position outside the bumper of the vehicle;

said cushion being substantially planar;

in said retracted position said cushion disposed parallel to the support surface;

said bumper protector including a slide mechanism which carries said cushion such that in said retracted position said cushion slides beneath the undercarriage of the vehicle, and in said extended position said cushion slides out from beneath the undercarriage of the vehicle;

said slide mechanism including a pair of rails and a sliding member which slides along said rails;

said cushion rotatably connected to said sliding member by a hinge;

a retainer for holding said cushion in said upright position;

said cushion having a handle for placing said cushion in said retracted position, for placing said cushion in said extended position, and for rotating said cushion to said upright position;

a mud flap which removably covers said handle; and, a connector for connecting said bumper protector to the undercarriage of the vehicle.

4. A method for protecting the bumper of a vehicle, comprising:

(a) providing a vehicle having a bumper and an undercarriage;

(b) providing a device for protecting said bumper of said vehicle including;

a bumper protector which is connectable to said undercarriage of said vehicle, said bumper protector including:

a cushion;

said bumper protector is connectable to said undercarriage of said vehicle so that said cushion is positionable to (1) a retracted position beneath said undercarriage of said vehicle, and (2) an extended position outwardly projecting from said vehicle;

in said extended position said cushion is rotatable to an upright position outside said bumper of said vehicle;

a slide which carries said cushion such that in said retracted position said cushion slides beneath said undercarriage of said vehicle, and in said extended position said cushion slides out from beneath said undercarriage of said vehicle;

a connector for connecting said bumper protector to said undercarriage of said vehicle;

(c) using said connector to connect said bumper protector to said undercarriage of said vehicle;

(d) placing said cushion in said retracted position;

(e) placing said cushion in said extended position; and, (f) when in said extended position, rotating said cushion to said upright position;

in (b), said cushion having a handle for placing said cushion in said retracted position, for placing said cushion in said extended position, and for rotating said cushion to said upright position, and a mud flap which removably covers said handle;

positioning said mud flap so that said handle is uncovered;

in (d), using said handle to place said cushion in said retracted position;

in (e), using said handle to place said cushion in said extended position; and, in (f), using said handle to rotate said cushion to said upright position.

5. The method of claim 4, further including:

said handle including an aperture in said cushion;

said mud flap having a plug which is snuggly removably received by said aperture; and, before (d), (e), and (f), ensuring that said mud flap does not cover said handle.

\* \* \* \* \*